United States Patent Office.

EDWARD H. ASHCROFT, OF LYNN, MASSACHUSETTS.

*Letters Patent No.* 81,576, *dated September* 1, 1868; *reissue No.* 4,045, *dated June* 28, 1870.

IMPROVEMENT IN NON-CORROSIVE VALVE-SEATS.

The Schedule referred to in these Letters Patent and making part of the same

*To all whom it may concern:*

Be it known that I, EDWARD H. ASHCROFT, of Boston, in the county of Suffolk and State of Maschusetts, have invented new and improved Non-corrosive Compositions of Metals for Valves for Steam-Boilers; and I do hereby declare that the following is a full, clear, and exact description thereof.

The object of my invention is to provide such metals, or compositions of metals, to be used in the manufacture of safety-valves, or other valves for steam-boilers, as will not become corroded by the action of water, steam, air, nor by any other action to which such valves are exposed.

It is well known to engineers and others that many, if not all, of the safety-valves now in common use, frequently become corroded to such an extent that the valve itself adheres to or is cemented to the "seat" so strongly that the whole object of such valves is defeated, and great danger to life and property ensues.

My invention consists in making these valves from the following non-corrosive alloys or metals, any and all of which answer the purpose more or less perfectly, to wit: an alloy of nickel and copper, free from zinc; aluminium, alone or alloyed; an alloy of gold or silver; combinations of the above.

I prefer, sometimes, to make the valve itself of one composition or metal and the "seat" of another, and, in the choice of the metal to be used, am governed somewhat by the exposure to which the valve will probably be subjected.

I do not confine myself to any exact proportions in casting these alloys, but to enable others skilled in the art to make them, I will state—

First, the alloy of nickel and copper, best suited to this purpose, is composed of from seventy to eighty per cent. of copper, with from twenty to thirty per cent. of nickel. This alloy may be rolled and cut into the desired form.

Second, the alloy of aluminium, best suited for valves, is one containing ninety per cent. of copper and ten per cent. of aluminium. This alloy is easily cast, behaves well under the file, and tarnishes less than any metal in common use.

There are other alloys of aluminium well known to persons skilled in metallurgy which are more or less non-corrosive, but I consider substantially the above proportions the best adapted to the purpose.

Third, alloys of gold with silver and copper are non-corrosive, and the best proportions are ninety per cent. of gold with ten per cent. of copper, or ninety per cent. of copper with ten per cent. of silver.

Fourth, combinations of the alloys mentioned above, in different proportions, yield alloys well adapted for safety-valves, but the most important practical and best alloy found is that of copper and nickel as "first" above given.

Having thus described my invention,

I claim as new and desire to secure by Letters Patent—

1. An alloy of nickel and copper, substantially as and for the purpose set forth.
2. An alloy of aluminium and copper, substantially as and for the purpose set forth.
3. An alloy of silver and copper, substantially as and for the purpose set forth.
4. An alloy of gold and copper, substantially as and for the purpose set forth.
5. Combinations of the above with each other, which yield a non-corrosive alloy, for the purpose set forth.
6. Aluminium alone, for the construction of valves or valve-seats, for the purpose set forth.

EDWARD H. ASHCROFT.

Witnesses:

MATTHEW PLUMSTEAD,
FREDERIC W. ASHCROFT.